US011215975B2

(12) United States Patent
Tatedoko et al.

(10) Patent No.: US 11,215,975 B2
(45) Date of Patent: Jan. 4, 2022

(54) APPARATUS, METHOD AND COMPUTER PROGRAM FOR IDENTIFYING DEFECTIVE DEVICES

(71) Applicant: MITSUBISHI ELECTRIC CORPORATION, Tokyo (JP)

(72) Inventors: Masashi Tatedoko, Tokyo (JP); Tsuyoshi Higuchi, Tokyo (JP); Kiyoto Kawauchi, Tokyo (JP); Takeshi Yoneda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/011,143

(22) Filed: Sep. 3, 2020

(65) Prior Publication Data

US 2020/0401117 A1 Dec. 24, 2020

Related U.S. Application Data

(63) Continuation of application No. PCT/JP2018/016118, filed on Apr. 19, 2018.

(51) Int. Cl.
G05B 19/418 (2006.01)

(52) U.S. Cl.
CPC ..... *G05B 19/4185* (2013.01); *G05B 19/4184* (2013.01); *G05B 19/41845* (2013.01); *G05B 19/41865* (2013.01)

(58) Field of Classification Search
CPC ............ G05B 19/4185; G05B 19/4184; G05B 19/41845; G05B 19/41865; G05B 23/0205; G05B 2219/32222; G05B 19/418; G05B 23/0235; G05B 23/0232; G05B 23/0221; Y02P 90/30; Y02P 90/02; G06Q 50/04; G06Q 10/06395
See application file for complete search history.

(56) References Cited

U.S. PATENT DOCUMENTS

| 8,554,904 | B2 | 10/2013 | Yasuie et al. | |
|---|---|---|---|---|
| 2008/0082302 | A1* | 4/2008 | Samardzija | .......... G05B 23/021 703/2 |
| 2010/0185762 | A1* | 7/2010 | Yasuie | ................ H04L 41/0677 709/224 |
| 2019/0018397 | A1* | 1/2019 | Shiba | ............... G05B 19/41875 |

FOREIGN PATENT DOCUMENTS

| JP | 2000198051 A | * | 7/2000 |
|---|---|---|---|
| JP | 2006319220 A | * | 11/2006 |

(Continued)

*Primary Examiner* — Kenneth M Lo
*Assistant Examiner* — Mohammed Shafayet
(74) *Attorney, Agent, or Firm* — Birch, Stewart, Kolasch & Birch, LLP

(57) ABSTRACT

An apparatus for identifying a path pattern of devices that produces a defective product in a production line where a product is produced via a plurality of device is provided. The device is configured to estimate a path pattern quality indicating a quality of a group of products produced through a production path included in a path pattern, based on a production path quality and an association relationship between a path pattern and a production path indicating devices via which the product is produced and an order of passing through the devices; and to identify a path pattern suspected to be defective based on the estimated path pattern quality.

13 Claims, 14 Drawing Sheets

(56) References Cited

FOREIGN PATENT DOCUMENTS

| | | |
|---|---|---|
| JP | 2010-170178 A | 8/2010 |
| JP | 2010-171544 A | 8/2010 |
| JP | 2015-154256 A | 8/2015 |
| WO | WO 2010/084685 A1 | 7/2010 |

* cited by examiner

Fig. 2A

Production Info. 121

| Production ID | Production Path | Production Quality |
|---|---|---|
| Production 1 | {Device1, Device2, Device3, Device5} | 1.0 |
| Production 2 | {Device1, Device4} | 1.0 |
| Production 3 | {Device1, Device3, Device2} | 1.0 |
| ⋮ | ⋮ | ⋮ |

Fig. 2B

Production path Info. 122

| Production Path ID | Production Path | Production Path Quality |
|---|---|---|
| Path1 | {Device1, Device2, Device3, Device5} | 0.0 |
| Path2 | {Device1, Device4} | 0.0 |
| Path3 | {Device1, Device3, Device2} | 0.0 |
| ⋮ | ⋮ | ⋮ |

Fig. 2C

Path Pattern Info. 123

| Path Pattern ID | Path Pattern | Path Pattern Quality |
|---|---|---|
| Pattern1 | (Device1, *, Device2) | N/A |
| Pattern2 | (Device1, *, Device3) | N/A |
| Pattern3 | (Device1, *, Device4) | N/A |
| Pattern4 | (Device1, *, Device5) | N/A |
| Pattern5 | (Device2, *, Device1) | N/A |
| ⋮ | ⋮ | ⋮ |

Fig. 2D  /124

Association Relationship Info.

| Production Path ID \ Path Pattern ID | Pattern1 | Pattern2 | Pattern3 | Pattern4 | Pattern5 | ... |
|---|---|---|---|---|---|---|
| Path1 | 1.0 | 1.0 | 0.0 | 1.0 | 0.0 | ... |
| Path2 | 0.0 | 0.0 | 1.0 | 0.0 | 0.0 | ... |
| Path3 | 1.0 | 1.0 | 0.0 | 0.0 | 0.0 | ... |
| ⋮ | ⋮ | ⋮ | ⋮ | ⋮ | ⋮ | ... |

Fig. 4

Production Path Info. (122)

| Production Path ID (221) | Production Path (222) | Production Path Quality (223) |
|---|---|---|
| Path1 | {Device3, Device4, Device5} | 0.0 |
| Path2 | {Device3, Device5, Device4} | 0.0 |
| Path3 | {Device4, Device1, Device2} | 0.0 |
| Path4 | {Device2, Device1, Device3} | 4.6 |
| Path5 | {Device4, Device5, Device1} | 0.0 |
| Path6 | {Device5, Device2, Device4} | 0.0 |
| Path7 | {Device1, Device2, Device4} | 0.0 |
| Path8 | {Device1, Device4, Device3} | 0.0 |
| Path9 | {Device3, Device4, Device1} | 0.0 |
| Path10 | {Device5, Device4, Device3} | 0.0 |
| Path11 | {Device1, Device4, Device2} | 0.0 |
| Path12 | {Device3, Device1, Device2} | 0.0 |
| Path13 | {Device5, Device3, Device2} | 0.0 |
| Path14 | {Device2, Device5, Device3} | 4.6 |
| Path15 | {Device4, Device3, Device2} | 0.0 |
| Path16 | {Device4, Device1, Device3} | 0.0 |
| Path17 | {Device4, Device3, Device1} | 0.0 |
| Path18 | {Device4, Device5, Device2} | 0.0 |
| Path19 | {Device4, Device5, Device3} | 0.0 |
| Path20 | {Device4, Device2, Device1} | 0.0 |

Fig. 5

Path Pattern Info. /123

| Path Pattern ID /231 | Path Pattern /232 | Path Pattern Quality /233 |
|---|---|---|
| Pattern1 | (Device1, *, Device2) | N/A |
| Pattern2 | (Device1, *, Device3) | N/A |
| Pattern3 | (Device1, *, Device4) | N/A |
| Pattern4 | (Device2, *, Device1) | N/A |
| Pattern5 | (Device2, *, Device3) | N/A |
| Pattern6 | (Device2, *, Device4) | N/A |
| Pattern7 | (Device2, *, Device5) | N/A |
| Pattern8 | (Device3, *, Device1) | N/A |
| Pattern9 | (Device3, *, Device2) | N/A |
| Pattern10 | (Device3, *, Device4) | N/A |
| Pattern11 | (Device3, *, Device5) | N/A |
| Pattern12 | (Device4, *, Device1) | N/A |
| Pattern13 | (Device4, *, Device2) | N/A |
| Pattern14 | (Device4, *, Device3) | N/A |
| Pattern15 | (Device4, *, Device5) | N/A |
| Pattern16 | (Device5, *, Device1) | N/A |
| Pattern17 | (Device5, *, Device2) | N/A |
| Pattern18 | (Device5, *, Device3) | N/A |
| Pattern19 | (Device5, *, Device4) | N/A |

Association Relationship Info.

| | PT 1 | PT 2 | PT 3 | PT 4 | PT 5 | PT 6 | PT 7 | PT 8 | PT 9 | PT 10 | PT 11 | PT 12 | PT 13 | PT 14 | PT 15 | PT 16 | PT 17 | PT 18 | PT 19 |
|---|---|---|---|---|---|---|---|---|---|---|---|---|---|---|---|---|---|---|---|
| Path 1 | 0 | 0 | 0 | 0 | 0 | 0 | 0 | 0 | 0 | 1 | 1 | 0 | 0 | 0 | 1 | 0 | 0 | 0 | 0 |
| Path 2 | 0 | 0 | 0 | 0 | 0 | 0 | 0 | 0 | 0 | 1 | 1 | 0 | 0 | 0 | 0 | 0 | 0 | 0 | 1 |
| Path 3 | 1 | 0 | 0 | 0 | 0 | 0 | 0 | 0 | 0 | 0 | 0 | 1 | 1 | 0 | 0 | 0 | 0 | 0 | 0 |
| Path 4 | 1 | 0 | 0 | 1 | 1 | 0 | 0 | 0 | 0 | 0 | 0 | 0 | 0 | 0 | 0 | 0 | 0 | 0 | 0 |
| Path 5 | 0 | 0 | 0 | 0 | 0 | 0 | 0 | 0 | 0 | 0 | 0 | 1 | 0 | 0 | 1 | 1 | 0 | 0 | 0 |
| Path 6 | 0 | 0 | 0 | 0 | 0 | 1 | 0 | 0 | 0 | 0 | 0 | 0 | 0 | 0 | 0 | 0 | 1 | 0 | 1 |
| Path 7 | 1 | 0 | 1 | 0 | 0 | 1 | 0 | 0 | 0 | 0 | 0 | 0 | 0 | 0 | 0 | 0 | 0 | 0 | 0 |
| Path 8 | 0 | 1 | 1 | 0 | 0 | 0 | 0 | 0 | 0 | 0 | 0 | 0 | 0 | 1 | 0 | 0 | 0 | 0 | 0 |
| Path 9 | 0 | 0 | 0 | 0 | 0 | 0 | 0 | 1 | 0 | 1 | 0 | 1 | 0 | 0 | 0 | 0 | 0 | 0 | 0 |
| Path 10 | 0 | 0 | 0 | 0 | 0 | 0 | 0 | 0 | 0 | 0 | 0 | 0 | 0 | 1 | 0 | 0 | 0 | 1 | 1 |
| Path 11 | 1 | 0 | 1 | 0 | 0 | 0 | 0 | 0 | 0 | 0 | 0 | 0 | 1 | 0 | 0 | 0 | 0 | 0 | 0 |
| Path 12 | 1 | 0 | 0 | 0 | 0 | 0 | 0 | 1 | 1 | 0 | 0 | 0 | 0 | 0 | 0 | 0 | 0 | 0 | 0 |
| Path 13 | 0 | 0 | 0 | 0 | 0 | 0 | 0 | 0 | 1 | 0 | 0 | 0 | 0 | 0 | 0 | 0 | 1 | 1 | 0 |
| Path 14 | 0 | 0 | 0 | 0 | 1 | 0 | 1 | 0 | 0 | 0 | 0 | 0 | 0 | 0 | 0 | 0 | 0 | 1 | 0 |
| Path 15 | 0 | 0 | 0 | 0 | 0 | 0 | 0 | 1 | 0 | 0 | 0 | 0 | 1 | 1 | 0 | 0 | 0 | 0 | 0 |
| Path 16 | 0 | 1 | 0 | 0 | 0 | 0 | 0 | 0 | 0 | 0 | 0 | 0 | 1 | 0 | 1 | 0 | 0 | 0 | 0 |
| Path 17 | 0 | 0 | 0 | 0 | 0 | 0 | 0 | 1 | 0 | 0 | 0 | 0 | 1 | 0 | 1 | 0 | 0 | 0 | 0 |
| Path 18 | 0 | 0 | 0 | 0 | 0 | 0 | 0 | 0 | 0 | 0 | 0 | 0 | 1 | 0 | 1 | 0 | 1 | 0 | 0 |
| Path 19 | 0 | 0 | 0 | 0 | 0 | 0 | 0 | 0 | 0 | 0 | 0 | 0 | 1 | 1 | 0 | 0 | 1 | 0 | 0 |
| Path 20 | 0 | 0 | 0 | 1 | 0 | 0 | 0 | 0 | 0 | 0 | 0 | 0 | 1 | 1 | 0 | 0 | 0 | 0 | 0 |

Fig. 7

Path Pattern Info. ~123

| Path Pattern ID ~231 | Path Pattern ~232 | Path Pattern Quality ~233 |
|---|---|---|
| Pattern1 | (Device1, *, Device2) | 0.0 |
| Pattern2 | (Device1, *, Device3) | 0.0 |
| Pattern3 | (Device1, *, Device4) | 0.0 |
| Pattern4 | (Device2, *, Device1) | 0.0 |
| Pattern5 | (Device2, *, Device3) | 4.5 |
| Pattern6 | (Device2, *, Device4) | 0.0 |
| Pattern7 | (Device2, *, Device5) | 0.0 |
| Pattern8 | (Device3, *, Device1) | 0.0 |
| Pattern9 | (Device3, *, Device2) | 0.0 |
| Pattern10 | (Device3, *, Device4) | 0.0 |
| Pattern11 | (Device3, *, Device5) | 0.0 |
| Pattern12 | (Device4, *, Device1) | 0.0 |
| Pattern13 | (Device4, *, Device2) | 0.0 |
| Pattern14 | (Device4, *, Device3) | 0.0 |
| Pattern15 | (Device4, *, Device5) | 0.0 |
| Pattern16 | (Device5, *, Device1) | 0.0 |
| Pattern17 | (Device5, *, Device2) | 0.0 |
| Pattern18 | (Device5, *, Device3) | 0.0 |
| Pattern19 | (Device5, *, Device4) | 0.0 |

Fig. 9A

Production Info. 1010

| Production ID 1011 | Production Path 1012 | Quality Measurement Time 1013 | Production Quality 1014 |
|---|---|---|---|
| Production1 | {Device1, Device3} | 21:17:35 | 1.0 |
| Production2 | {Device1, Device2, Device4} | 21:18:20 | 1.0 |
| ⋮ | ⋮ | · | ⋮ |

Fig. 9B

Production Path Info. 1020

| Production Path ID 1021 | Production Path 1022 | Measurement Start Time 1023 | Measurement End Time 1024 | Production Path Quality 1025 |
|---|---|---|---|---|
| Path1 | {Device1, Device3} | 21:15:00 | 21:19:55 | 0.0 |
| Path2 | {Device1, Device2, Device4} | 21:20:00 | 21:24:55 | 0.0 |
| ⋮ | ⋮ | ⋮ | ⋮ | · |

Fig. 9C

Path Pattern Info. 1030

| Path Pattern ID 1031 | Path Pattern 1032 | Measurement Start Time 1033 | Measurement End Time 1034 | Path Pattern Quality 1035 |
|---|---|---|---|---|
| Pattern1 | (Device1, *, Device2) | 21:15:00 | 21:19:55 | N/A |
| Pattern2 | (Device1, *, Device3) | 21:20:00 | 21:24:55 | N/A |
| ⋮ | ⋮ | ⋮ | ⋮ | · |

Fig. 9D

Association Relationship Info. 1040

| Production Path ID \ Path Pattern ID | Pattern1 | Pattern2 | ... |
|---|---|---|---|
| Path1 | 0.0 | 1.0 | ... |
| Path2 | 1.0 | 0.0 | ... |
| ⋮ | ⋮ | ⋮ | ... |

1041, 1042

US 11,215,975 B2

APPARATUS, METHOD AND COMPUTER PROGRAM FOR IDENTIFYING DEFECTIVE DEVICES

CROSS REFERENCE TO RELATED APPLICATIONS

This application is a Continuation of PCT International Application No. PCT/JP2018/016118, filed on Apr. 19, 2018, which is hereby expressly incorporated by reference into the present application.

TECHNICAL FIELD

The present invention relates to an apparatus, method and computer program for identifying a pattern of devices that produces a defective product in a production line where a product is produced via a plurality of devices.

BACKGROUND ART

Hitherto, there has been known a technology of identifying a device suspected to be defective such as failure or cyberattack from the outside, in a production line where a product is produced via a plurality of devices (e.g., refer to Patent Literature 1).

In Patent Literature 1, there is described a method for identifying a device suspected to be defective, in a production line of a factory or a plant, by visualizing a product quality for each device based on a quality of a product and a production path indicating devices through which the product has been produced.

CITATION LIST

Patent Literature

[PTL 1] JP 2010-170178 A

SUMMARY OF INVENTION

Technical Problem

Now, consideration a case in which, in a production line where a product is produced via a plurality of devices, e.g. Device 1 and Device 2 are configured to perform a drilling process, and Device 3 and Device 4 are configured to perform a screwing process. In this case, a combination of the drilling process and the screwing process may be changed flexibly depending on an operation status of each device.

However, there may be a path pattern that produces a defective product depending on a combination of the devices. As an example, there may occur a phenomenon that the quality of a product passing through Device 3 after Device 1, the quality of a product passing through Device 4 after Device 1 and the quality of a product passing through Device 3 after Device 2 are all normal, but only the quality of a product passing through Device 4 after Device 2 is defective.

The phenomenon described above may occur, e.g. when a hole made in Device 1 falls within a range of an allowable error but deviates to the left a little, a hole made in Device 2 falls within a range of an allowable error but deviates to the right a little, a screw inserted in Device 3 is accurately inserted at the center, and a screw inserted in Device 4 falls within a range of an allowable error but deviates to the left a little. This phenomenon can be said that a defective product is produced due to a negative interaction between Device 2 and Device 4.

With the method described in Patent Literature 1, it is possible to identify a single device that produce a defective product. However, it is not possible to identify a path pattern of devices that produces a defective product. In the above-mentioned example, it is not possible to identify a path pattern that produces a defective product when there is a pattern in which a product passes through Device 4 after Device 2.

Meanwhile, there may be not only a path pattern in which Device 2 and Device 4 are next to each other, but also a path pattern in which one or more other devices are arranged between Device 2 and Device 4. Then, also in a path pattern including one or more other devices between Device 2 and Device 4 in this manner, a defective product may be produced through a path pattern in which Device 2 precedes Device 4 due to the negative interaction between Device 2 and Device 4. Further, the number of devices having a negative interaction is not limited to two, and there may be a situation in which a defective product is produced when the product passes through three or more devices.

More generally, when there is a sequential order of two or more devices having a negative interaction in a path pattern of devices that produces a defective product, it is important to identify such a sequential order of the plurality of devices. However, with the related art described in Patent Literature 1, the sequential order of two or more devices having the negative interaction cannot be identified.

The present invention has been made to solve the above-mentioned problem, and has an object to provide an apparatus, method and computer program, which can identify a sequential order of two or more devices that produces a defective product in a production line where a product is produced via a plurality of devices.

Solution to Problem

In order to achieve the above-mentioned object, according to one embodiment of the present invention, there is provided an apparatus for identifying a path pattern of devices that produces a defective product in a production line where a product is produced via a plurality of devices, the apparatus comprising: a production path extractor configured to extract a production path indicating devices via which the product is produced and an order of passing through the devices; a production path quality generator configured to generate a production path quality indicating a quality of a group of products produced through the production path; a path pattern generator configured to generate a possible path pattern indicating devices via which the product is produced and an order of passing through the devices, in accordance with a number of indispensable devices indicating a number of devices that must be included in the path pattern; an association relationship generator configured to generate an association relationship between the production path and the path pattern; a path pattern quality estimator configured to estimate a path pattern quality indicating a quality of a group of products produced through a production path included in the path pattern, based on the association relationship and the production path quality; and a defective path pattern identifier configured to identify a defective path pattern for which a value of the path pattern quality is equal to or larger than a predetermined threshold value.

Advantageous Effects of Invention

The apparatus, method and computer program according to the present invention have a configuration which can identify a sequential order of two or more devices that produces a defective product based on known data on the production path and the production path quality. As a result, it is possible to identify the sequential order of two or more devices that produces a defective product in the production line where the product is produced via the plurality of devices.

BRIEF DESCRIPTION OF DRAWINGS

FIG. 2A is an example of data structure of product information in the first embodiment of the present invention.

FIG. 2B is an example of data structure of production path information in the first embodiment of the present invention.

FIG. 2C is an example of data structure of path pattern information in the first embodiment of the present invention.

FIG. 2D is an example of data structure of association relationship information in the first embodiment of the present invention.

FIG. 4 shows production path information in Example 1 of the first embodiment of the present invention.

FIG. 5 shows path pattern information in Example 1 of the first embodiment of the present invention.

FIG. 6 shows association relationship information in Example 1 of the first embodiment of the present invention.

FIG. 7 shows a path pattern quality in Example 1 of the first embodiment of the present invention.

FIG. 9A is an example of data structure of product information in the second embodiment of the present invention.

FIG. 9B is an example of data structure of production path information in the second embodiment of the present invention.

FIG. 9C is an example of data structure of path pattern information in the second embodiment of the present invention.

FIG. 9D is an example of data structure of association relationship information in the second embodiment of the present invention.

DESCRIPTION OF EMBODIMENTS

Now, details of embodiments of the present invention are described with reference to the accompanying drawings. However, it should be noted that the embodiments described below are merely examples, and the present invention is not limited to those embodiments.

First Embodiment

Figure 1:
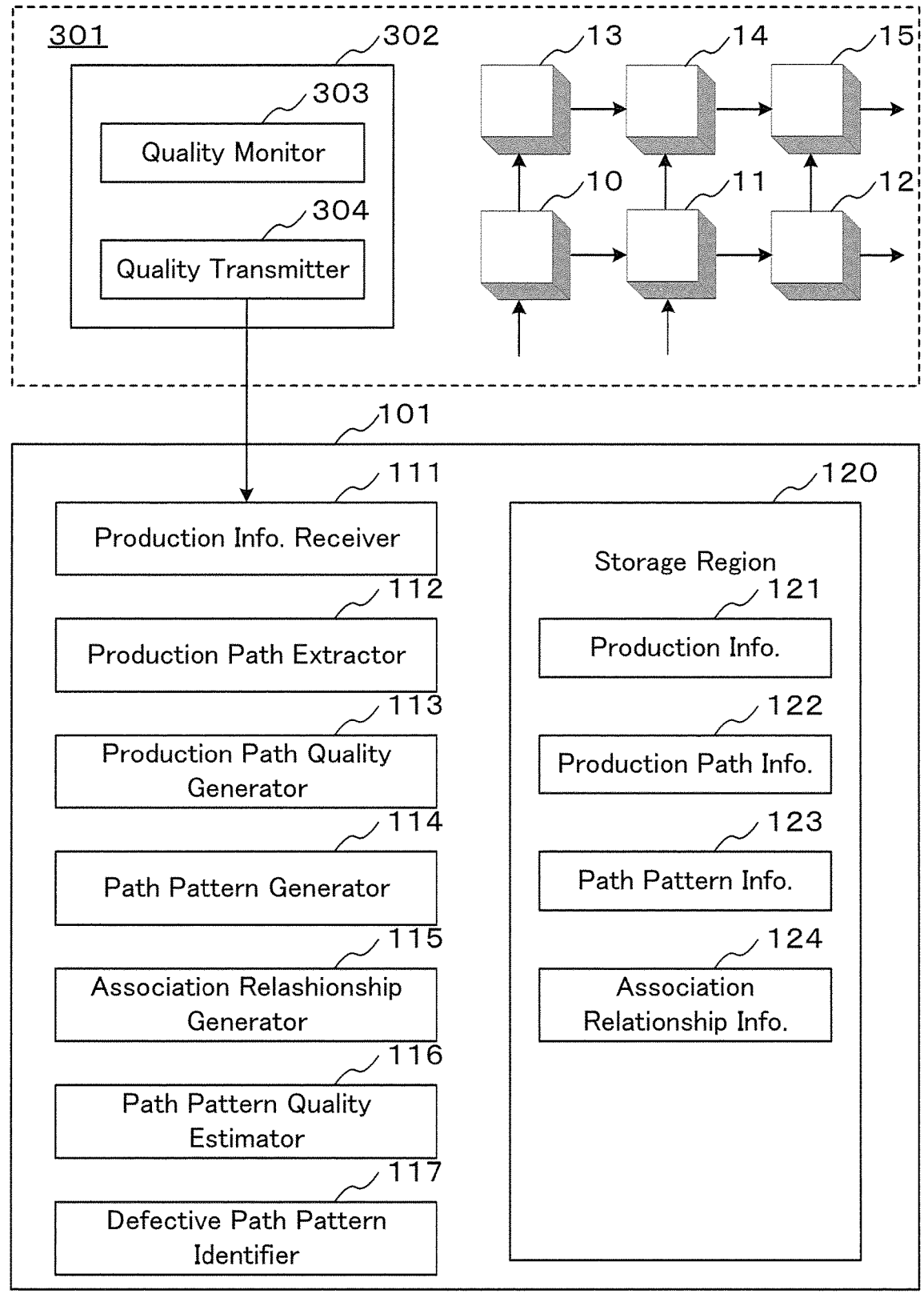
FIG. 1 is a configuration diagram of a first embodiment of the present invention.

FIG. 1 is a configuration diagram of a first embodiment of the present invention. A factory 301 includes various kinds of devices 10 to 15 for processing a product. Further, the factory 301 includes an apparatus for monitoring quality 302 configured to monitor a production path and a quality of a product to be produced. The apparatus for monitoring quality 302 transmits, to an apparatus for identifying defective 101, information containing the production path and the quality of a product to be produced in the factory 301.

(Configuration of Apparatus for Monitoring Quality 302)

First, the configuration of the apparatus for monitoring quality 302 is described. The apparatus for monitoring quality 302 is constructed by a well-known computer. The apparatus for monitoring quality 302 comprises a quality monitor 303 and a quality transmitter 304. Those components 303 and 304 of the apparatus for monitoring quality 302 may be constructed by hardware, or may be implemented as software of programs to be executed by a CPU (not shown) of the apparatus for monitoring quality 302.

The quality monitor 303 is configured to monitor the production path and the quality of a product to be produced in the factory 301, and to create information containing the production path and the quality of a product. The quality transmitter 304 is configured to transmit, to the apparatus for identifying defective 101, information containing the production path and the quality of a product, which has been created by the apparatus for monitoring quality 302.

In FIG. 1, the apparatus for identifying Defective 101 may be connected to a plurality of apparatus for monitoring quality 302 of a plurality of factories 301. Further, the apparatus for identifying defective 101 may be connected to the plurality of apparatus for monitoring quality 302 through a network configuration in which the plurality of apparatus for monitoring quality 302 form hierarchical structure.

(Configuration of Apparatus for Identifying Defective 101)

Next, the configuration of the apparatus for identifying defective 101 is described. The apparatus for identifying defective 101 is constructed by a well-known computer. The apparatus for identifying defective 101 comprises a product information receiver 111, a production path extractor 112, a production path quality generator 113, a path pattern generator 114, an association relationship generator 115, a path pattern quality estimator 116, an defective path pattern identifier 117 and a storage region 120.

Those components 111 to 117 of the apparatus for identifying defective 101 may be constructed by hardware, or may be implemented as software of programs to be executed by a CPU (not shown) of the apparatus for identifying defective 101.

(Product Information Receiver 111)

The product information receiver 111 is configured to receive information containing the production path and the quality of a product, which has been transmitted from the apparatus for monitoring quality 302, and to store the received information into product information 121 of the storage region 120.

FIG. 2A shows an example of data structure of the product information 121. The product information 121 contains a product ID 211, a production path 212 and a product quality 213.

The product ID 211 is a unique identifier for identifying a product. The production path 212 is a character string representing devices via which the product is produced and an order of passing through those devices. For example, the production path 212 is a character string of "{Device 1, Device 2, Device 3}." The product quality 213 is information representing the quality of the product. The product quality 213 takes a real number equal to or larger than 0 and equal to or smaller than 1, and a larger value indicates a higher quality.

The production path and the quality of a product may not be received at the same time. In other words, the production path and the quality may be received in any order as long as the production path and the quality can be associated with each other by a separate product ID.

(Production Path Extractor 112)

The production path extractor 112 is configured to extract, for each product, a production path through which the product is produced based on the product information 121 of FIG. 2A, to merge overlapped production paths, and to store the merged production path into production path information 122 of the storage region 120.

(Production Path Quality Generator 113)

The production path quality generator 113 is configured to generate, for each production path extracted and merged by the production path extractor 112, a production path quality indicating a quality of a group of products produced through the production path, and to store the generated production path quality into the production path information 122 of the storage region 120.

FIG. 2B shows an example of data structure of the production path information 122. The production path information 122 contains a production path ID 221, a production path 222 and a production path quality 223.

The production path ID 221 is a unique identifier for identifying a production path through which a product is produced. The production path 222 is a character string representing devices via which the product is produced and an order of passing through those devices. The production path quality 223 is information indicating a quality of a group of products produced through the production path.

For example, the production path quality 223 is defined by the following expression.

$$-\log\left(1-\left(\frac{1-\text{Total product qualities belonging to the same production path } ID}{\text{Number of products belonging to the same production path } ID}\right)\right)$$

In the expression given above, the production path quality 223 takes a value of 0 when the production path quality 223 is normal, whereas the production path quality 223 takes a value other than 0 when the production path quality 223 is defective. When the production path quality 223 takes a value other than 0, the magnitude of the value indicates a degree of defectiveness of a group of products produced through the production path.

(Path Pattern Generator 114)

The path pattern generator 114 is configured to generate a possible "path pattern(s)" representing devices via which a product is produced and an order of passing through those devices, based on the production path 222 of the production path information 122 of FIG. 2B, and to store the path pattern(s) into path pattern information 123 of the storage region 120.

Now, the concept of the "path pattern(s)", which is a feature of the invention of the present application, is described. Each of the "path pattern(s)" is a possible pattern representing devices via which a product is produced and an order of passing through those devices. The path pattern(s) can be generated when the devices included in the production path information of FIG. 2B and the "number of indispensable devices," which is the number of devices that must be included in the pattern(s), are specified.

Further, when a certain Path Pattern A is included in a certain Production Path B, it is said that "Path Pattern A matches Production Path B." Further, when a certain Path Pattern A is not included in a certain Production Path B, it is said that "Path Pattern A does not match Production Path B."

For example, in FIG. 2B, if there are five devices, i.e. Device 1 to Device 5, and "1" is specified as the "number of indispensable devices," there are five possible path patterns, i.e. (Device 1), (Device 2), (Device 3), (Device 4) and (Device 5).

At this time, regarding Path Pattern (Device 1), this path pattern matches three production paths, i.e. Path 1 {Device 1, Device 2, Device 3, Device 5}, Path 2 {Device 1, Device 4} and Path 3 {Device 1, Device 3, Device 2}, among the production paths of FIG. 2B.

Further, regarding Path Pattern (Device 2), this path pattern matches two production paths, i.e. Path 1 {Device 1, Device 2, Device 3, Device 5} and Path 3 {Device 1, Device 3, Device 2}, among the production paths of FIG. 2B.

Similarly, Path Pattern (Device 3) matches two production paths, i.e. Path 1 {Device 1, Device 2, Device 3, Device 5} and Path 3 {Device 1, Device 3, Device 2}. Path Pattern (Device 4) matches one production path, i.e. Path 2 {Device 1, Device 4}. Path Pattern (Device 5) matches one production path, i.e. Path 1 {Device 1, Device 2, Device 3, Device 5}.

Further, in FIG. 2B, if "2" is specified as the "number of indispensable devices," there are twenty possible path patterns, i.e. (Device 1, *, Device 2), (Device 1, *, Device 3), (Device 1, *, Device 4), (Device 1, *, Device 5), (Device 2, *, Device 1), (Device 2, *, Device 3), (Device 2, *, Device 4), (Device 2, *, Device 5), (Device 3, *, Device 1), (Device 3, *, Device 2), (Device 3, *, Device 4), (Device 3, *, Device 5), (Device 4, *, Device 1), (Device 4, *, Device 2), (Device 4, *, Device 3), (Device 4, *, Device 5), (Device 5, *, Device 1), (Device 5, *, Device 2), (Device 5, *, Device 3) and (Device 5, *, Device 4).

The symbol "*" in the above-mentioned path patterns is a Wild Card indicating that any number of devices including zero device may be included. For example, regarding Path Pattern (Device 1, *, Device 2), this pattern matches two production paths, i.e. {Device 1, Device 2, Device 3, Device 5} and {Device 1, Device 3, Device 2} among the production paths of FIG. 2B. In other words, Path Pattern (Device 1, *, Device 2) matches a production path(s) in which the sequential order of Device 1 and Device 2 is included.

Similarly, in FIG. 2B, if "3" is specified as the "number of indispensable devices," there are sixty possible path patterns, i.e. (Device 1, *, Device 2, *, Device 3), . . . , (Device 5, *, Device 4, *, Device 3). For example, regarding Path Pattern (Device 1, *, Device 2, *, Device 5), this pattern matches one production path, i.e. {Device 1, Device 2, Device 3, Device 5} among the production paths of FIG. 2B. In other words, Path Pattern (Device 1, *, Device 2, *, Device 5) matches a production path(s) in which the sequential order of Device 1, Device 2 and Device 5 is included.

FIG. 2C shows an example of data structure of the path pattern information 123. The path pattern information 123 contains a path pattern ID 231, a path pattern 232 and a path pattern quality 233.

The path pattern ID 231 is a unique identifier for identifying a path pattern. As described above, the path pattern 232 is a character string which represents a possible pattern(s) representing devices via which a product is produced and an order of passing through those devices. There may be a path pattern that does not match any one of production paths of FIG. 2B, and such a path pattern is excluded so as to reduce the amount of calculation.

The path pattern quality 233 is information indicating the quality of a group of products produced through a production path(s) matching the path pattern.

The path pattern quality 233 takes a value equal to or smaller than a predetermined threshold value when the path pattern quality 233 is normal, whereas the path pattern quality 233 takes a value larger than the threshold value when the path pattern quality 233 is defective. When the path pattern quality 233 takes a value larger than the threshold value, the magnitude of the value indicates a degree of defectiveness of a group of products produced through the production path(s) matching the path pattern.

The path pattern quality 233 is unknown at the time of generation of a path pattern(s) by the path pattern generator 114, and is initialized by an expression enabling distinction from invalidity, for example "N/A".

(Association Relationship Generator 115)

The association relationship generator 115 is configured to extract an association relationship between the production path 222 and the path pattern 232 based on the production path information 122 of FIG. 2B and the path pattern information 123 of FIG. 2C, and to store the extracted association relationship into association relationship information 124 of the storage region 120.

FIG. 2D shows an example of data structure of the association relationship information 124. The association relationship information 124 contains a production path ID 241 and a path pattern ID 242.

The production path ID 241 is an arrangement of production path IDs stored in the production path ID 221 of the production path information 122 of FIG. 2B in a row direction. The path pattern ID 242 is an arrangement of path pattern IDs stored in the path pattern ID 231 of the path pattern information 123 of FIG. 2C in a column direction.

Regarding the association relationship information 124 of FIG. 2D, considering a cell at which the production path ID 241 and the path pattern ID 242 intersect with each other, for example a cell 243 at which Production Path 1 and Path Pattern 1 intersect with each other. When Production Path 1 matches Path Pattern 1, "1" is stored in the cell 243. When Production Path 1 does not match Path Pattern 1, "0" is stored in the cell 243.

Alternatively, when Production Path 1 matches Path Pattern 1, a value that is larger than 0 and depends on the degree of Production Path 1 matching Path Pattern 1 may be stored.

(Path Pattern Quality Estimator 116)

The path pattern quality estimator 116 is configured to estimate the quality of each path pattern, i.e. the quality of a group of products produced through the production path(s) matching the path pattern based on the association relationship information 124 of FIG. 2D and the production path quality 223 of the production path information 122 of FIG. 2B, and to store the estimated quality of each path pattern into the path pattern quality 233 of the path pattern information 123 of FIG. 2C.

An example of the method of estimating the path pattern quality 233 is estimating the path pattern quality on the assumption that the production path quality is obtained as a linear observation of the path pattern quality based on the association relationship between the production path and the path pattern.

Specifically, the production path quality 223 of the production path information 122 of FIG. 2B, the path pattern quality 233 of the path pattern information 123 of FIG. 2C and the association relationship information 124 of FIG. 2D are set as a constant vector y, a variable vector x and a matrix A, respectively, and these are substituted into a definition expression of linear observation. As a result, the following equation is obtained.

$$\|y-Ax\|$$

On the basis of the equation given above, the variable vector x is estimated by solving an optimization problem of calculating x that minimizes the following cost function under a constraint condition $x \geq 0$.

$$\|y-Ax\|$$

(Defective Path Pattern Identifier 117)

The defective path pattern identifier 117 is configured to identify a path pattern(s) for which the value of the path pattern quality is equal to or larger than a predetermined threshold value as a "defective path pattern(s)" based on the path pattern information 123 of FIG. 2C including the estimated path pattern quality.

Further, the defective path pattern identifier 117 is configured to extract a device(s) commonly included in the defective path pattern(s) as a device(s) suspected to be defective, and to identify the extracted device(s) in an order of degree of defectiveness. A method of setting the order of degree of defectiveness is considered to be, for example setting the order by prioritizing devices commonly included in the defective path pattern(s) having a larger value of the path pattern quality. The defective path pattern identifier 117 outputs the identified device(s) to a monitor (not shown) as a device(s) suspected to be defective such as failure or cyberattack from the outside.

(Operation of Apparatus for Identifying Defective 101)

Figure 3:
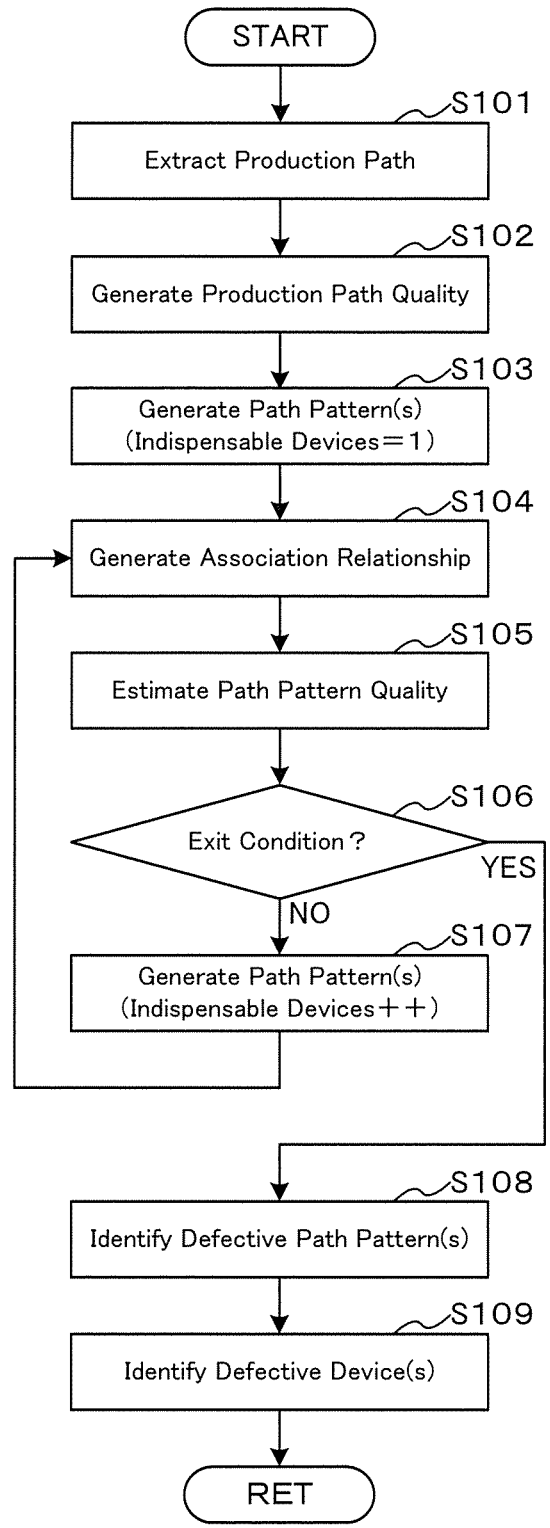
FIG. 3 is a flow chart for illustrating an operation of an apparatus for identifying defective devices according to the first embodiment of the present invention.

Next, an operation of the apparatus identifying Defective 101 according to the first embodiment of the present invention is given, with reference to the flow chart illustrated in FIG. 3. It is assumed that, at the time of start of the flow chart of FIG. 3, information containing the production path and the quality of a product, which has been transmitted from the apparatus for monitoring quality 302, is previously received by the product information receiver 111, and the storage region 120 has stored the received information as the product information 121 (FIG. 2A).

In Step S101, for each product, the production path extractor 112 extracts a production path through which the product is produced based on the product information 121 of FIG. 2A, and merges overlapped production paths. The production path extractor 112 stores the extracted and merged production path into the production path information 122 of FIG. 2B as the production path ID 221 and the production path 222.

In Step S102, for each production path, the production path quality generator 113 generates a production path quality indicating the quality of a group of products produced through the production path. The production path quality generator 113 stores the generated production path quality into the production path information 122 of FIG. 2B as the production path quality 223.

In Step S103, the path pattern generator 114 specifies "1" as the "number of indispensable devices" described above based on the production path 222 of the production path information 122 of FIG. 2B, and generates a possible path pattern(s). There may be a path pattern that does not match any one of production paths of FIG. 2B, and such path pattern is excluded so as to reduce the amount of calculation. The path pattern generator 114 stores the generated path pattern(s) into the path pattern information 123 of FIG. 2C as the path pattern ID 231 and the path pattern 232. At this time, the path pattern quality 233 is initialized by an expression enabling distinction from invalidity, for example "N/A".

In Step S104, the association relationship generator 115 extracts an association relationship between the production path 222 and the path pattern 232 based on the production path information 122 of FIG. 2B and the path pattern information 123 of FIG. 2C, and stores the extracted association relationship into the association relationship information 124 of FIG. 2D.

In Step S105, the path pattern quality estimator 116 estimates the quality of each path pattern based on the association relationship information 124 of FIG. 2D and the production path quality 223 of the production path information 122 of FIG. 2B. The path pattern quality estimator 116 stores the estimated quality of each path pattern into the path pattern information 123 of FIG. 2C as the path pattern quality 233.

In Step S106, the path pattern generator 114 determines whether a predetermined exit condition is satisfied. Specifically, the path pattern generator 114 extracts, from the path pattern information 123 of FIG. 2C, all the path patterns for which the value of the path pattern quality is equal to or larger than a predetermined threshold value.

If the number of path patterns extracted in Step S106 is equal to or larger than a predetermined value, or the number of times of execution of Step S105, i.e. the number of times of estimation of the path pattern quality is equal to or larger than a predetermined number of times, the path pattern generator 114 determines that the exit condition has been satisfied, and the process goes to Step S107. Otherwise, the path pattern generator 114 determines that the exit condition has not been satisfied, and the process goes to Step S108.

Alternatively, the path pattern generator 114 may compare the tendency of the path pattern quality estimated at the previous iteration with the tendency of the path pattern quality estimated at the current iteration to determine whether the comparison result converges to a predetermined range.

Further alternatively, the path pattern generator 114 may record the number of path patterns extracted in Step S106 while incrementing the "number of indispensable devices" by one. And when the "number of indispensable devices" with the least number of extracted path patterns is identified, the path pattern generator 114 may determine that the exit condition is satisfied.

In general, when considering a graph with the number of indispensable devices as the horizontal axis and the number of extracted path patterns as the vertical axis, this graph tends to be convex downward. Further, identifying the number of indispensable devices with the least number of extracted path patterns means that identifying the number of indispensable devices with the minimum value of the graph.

In Step S107, the path pattern generator 114 increments the "number of indispensable devices" by one, and generates a possible path pattern(s). The path pattern generator 114 stores the generated path pattern(s) into the path pattern information 123 of FIG. 2C. At this time, the path pattern quality 233 is initialized by an expression enabling distinction from invalidity, for example "N/A". After that, the process returns to Step S104.

In Step S108, the defective path pattern identifier 117 identifies, based on the path pattern information 123 of FIG. 2C, a path pattern(s) for which the value of the path pattern quality is equal to or larger than a predetermined threshold value, as a "defective path pattern(s)" suspected to produce a defective product.

In Step S109, the defective path pattern identifier 117 identifies a device(s) commonly included in the defective path pattern(s) identified in Step S108. The defective path pattern identifier 117 outputs the identified device(s) to the monitor (not shown) as a device(s) suspected to be defective such as failure or cyberattack from the outside.

Example 1

Next, description is made of a specific example of identifying a "defective path pattern(s)" suspected to produce a defective product by the apparatus for identifying defective 101 according to the first embodiment of the present invention with reference to FIG. 4 to FIG. 7.

In the example of the production path information 122 shown in FIG. 4, there are twenty production paths, i.e. Path 1 to Path 20, and Device 1 to Device 5 are arranged on the way of those production paths.

For example, if "2" is specified as the "number of indispensable devices", the path pattern information 123 shown in FIG. 5 is obtained from the production path information 122 of FIG. 4. In FIG. 5, a path pattern(s) that does not match any one of production paths of FIG. 4 is excluded.

Further, the association relationship information 124 shown in FIG. 6 is obtained from the production path information 122 of FIG. 4 and the path pattern information 123 of FIG. 5. The description of "PT" in FIG. 6 means "Pattern".

The path pattern quality 233 shown in FIG. 7 is estimated from FIG. 4 to FIG. 6. Referring to FIG. 7, it can be understood that a product produced through a production path(s) matching a Path Pattern (Device 2, *, Device 3), i.e. a path pattern in which Device 3 is arranged after Device 2 and zero or more devices are arranged between Device 3 and Device 2, has low quality. Whereas, products produced through other production paths has high quality.

The defective path pattern identifier 117 of the apparatus for identifying defective 101 identifies (Device 2, *, Device 3) as a "defective path pattern" suspected to produce a defective product.

As described above, the apparatus for identifying defective according to the first embodiment of the present invention estimates a path pattern quality indicating the quality of a group of products produced through a production path matching a path pattern based on the association relationship between the production path and the path pattern and the production path quality, and identifies a path pattern suspected to produce a defective product based on the estimated path pattern quality.

With the above-mentioned feature, if there is a path pattern(s) including a device(s) that produces a defective product in a production line where a product is produced via a plurality of devices, it is possible to identify such a pattern(s).

Second Embodiment

Figure 8:
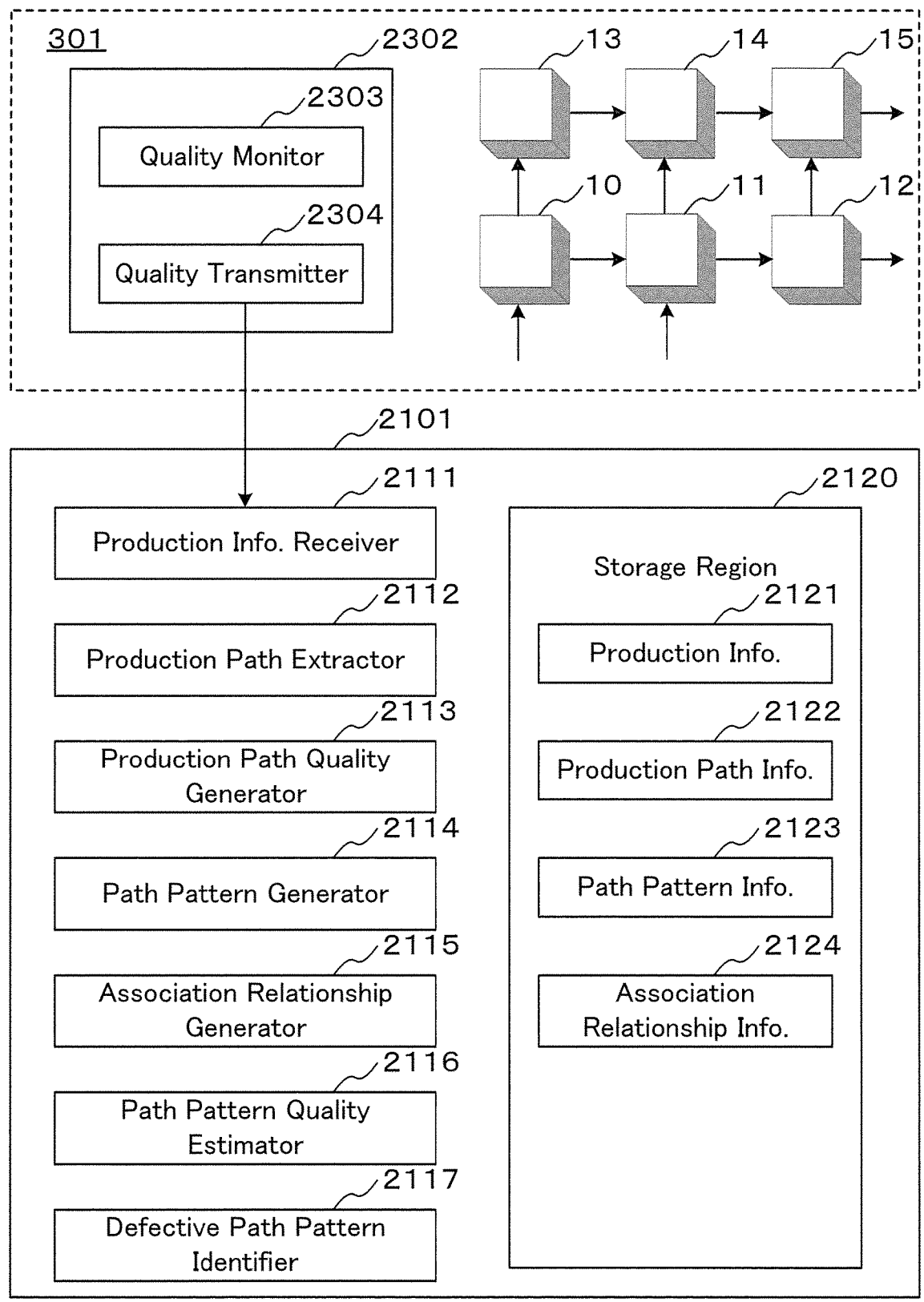
FIG. 8 is a configuration diagram of a second embodiment of the present invention.

FIG. 8 is a configuration diagram of a second embodiment of the present invention. In the second embodiment, it is possible to handle a defective situation in which the path pattern quality worsens over time.

(Configuration of Apparatus for Monitoring Quality 2302)

An apparatus for monitoring quality 2302 comprises a quality monitor 2303 and a quality transmitter 2304. The quality monitor 2303 is configured to monitor the production path and the quality of a product produced in the factory 301 as well as the time of measuring the quality, and to create information containing the production path and the quality of a product as well as the time of measuring the quality. The quality transmitter 2304 transmits, to the apparatus for identifying defective 2101, the information containing the production path and the quality of a product as well as the time of measuring the quality which has been created by the apparatus for monitoring quality 2303.

(Configuration of Apparatus for Identifying Defective 2101)

The apparatus for identifying defective 2101 comprises a product information receiver 2111, a production path extractor 2112, a production path quality generator 2113, a path pattern generator 2114, an association relationship generator 2115, a path pattern quality estimator 2116 and a defective path pattern identifier 2117. Those components are constructed by adding a concept of the time of measuring the product quality to the apparatus for identifying defective 101 in the first embodiment.

(Data Structure)

Next, the data structure in the second embodiment is described with reference to FIG. 9A to FIG. 9D. The data structure in the second embodiment is constructed by adding the concept of the time of measuring the product quality to the data structure in the first embodiment.

FIG. 9A shows an example of data structure of a product information 1010 in the second embodiment. The product information 1010 contains a product ID 1011, a production path 1012, a quality measurement time 1013 and a product quality 1014.

The product ID 1011, the production path 1012 and the product quality 1014 are the identical as those contained in the product information 121 in the first embodiment. The quality measurement time 1013 is a time at which the product quality has been measured.

FIG. 9B shows an example of data structure of a production path information 1020 in the second embodiment. The production path information 1020 contains a production path ID 1021, a production path 1022, a measurement start time 1023, a measurement end time 1024 and a production path quality 1025.

The production path ID 1021, the production path 1022 and the production path quality 1025 are the identical as those contained in the production path information 122 in the first embodiment.

The measurement start time 1023 and the measurement end time 1024 are specified by the defective path pattern identifier 2117 described in detail later, and specify a range of time period of measuring the product qualities to be aggregated into the production path quality 1025. For example, if the measurement start time is specified as t1 and the measurement end time is specified as t2 respectively, only the product qualities measured between the time t1 and the time t2 are aggregated into the production path quality.

FIG. 9C shows an example of data structure of a path pattern information 1030 in the second embodiment. The path pattern information 1030 contains a path pattern ID 1031, a path pattern 1032, a measurement start time 1033, a measurement end time 1034 and a path pattern quality 1035.

The path pattern ID 1031, the path pattern 1032 and the path pattern quality 1035 are the identical as those contained in the path pattern information 123 in the first embodiment.

The measurement start time 1033 is a time of starting to measure a production path quality matching the path pattern. The measurement end time 1034 is a time of finishing to measure the production path quality matching the path pattern.

FIG. 9D shows an example of data structure of an association relationship information 1040 in the second embodiment. The association relationship information 1040 contains a production path ID 1041 and a path pattern ID 1042.

The production path ID 1041 and the path pattern ID 1042 are the identical as those contained in the association relationship information 124 in the first embodiment.

(Operation of Apparatus for Identifying Defective 2101)

Figure 10:
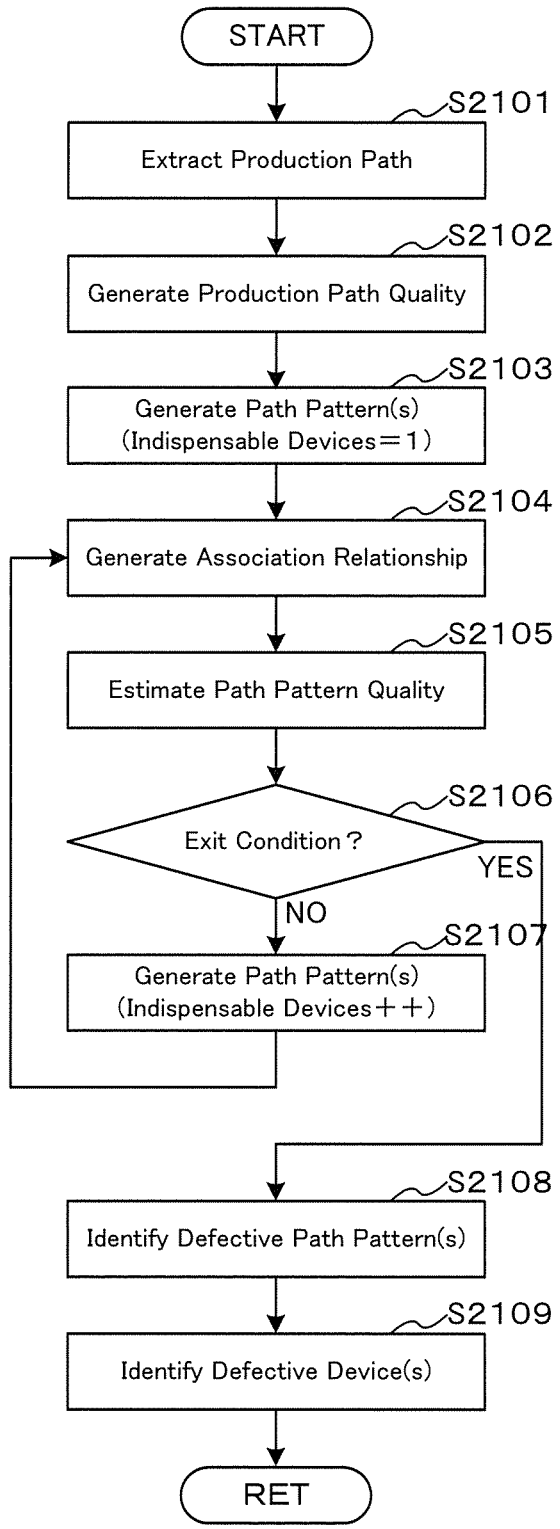
FIG. 10 is a flow chart for illustrating an operation of an apparatus for identifying defective devices according to the second embodiment of the present invention.
Figure 11:
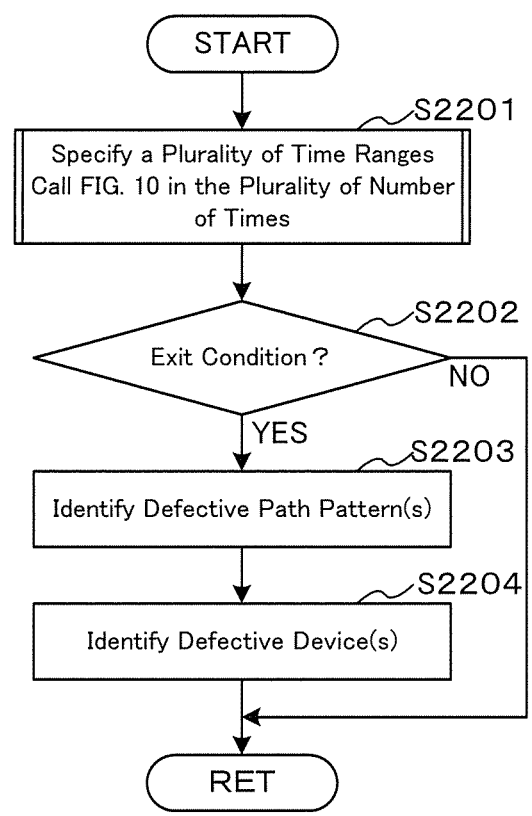
FIG. 11 is a flow chart for illustrating an operation of an apparatus for identifying defective devices according to the second embodiment of the present invention.

Next, an operation of the apparatus for identifying Defective 2101 according to the second embodiment of the present invention is given, with reference to flow charts illustrated in FIG. 10 and FIG. 11. It is assumed that, at the time of start of the flow charts of FIG. 10 and FIG. 11, information containing the production path and the quality of a product, which has been transmitted from the apparatus for monitoring quality 2302, and the time of measuring the quality is previously received by the product information receiver 2111, and a storage region 2120 has stored the received information as the product information 2121 (FIG. 9A).

First, the process of the flow chart illustrated in FIG. 10 is described. The flow chart of FIG. 10 is created by adding the concept of the time of measuring the product quality to the flow chart of FIG. 3 in the first embodiment. The process of the flow chart of FIG. 10 is repeatedly called from Step S2201 of the flow chart of FIG. 11 described next.

In Step S2101, for each product that the quality has been measured between the measurement start time and the measurement end time specified by the defective path pattern identifier 2117, the production path extractor 2112 extracts, a production path through which the product is produced based on the product information 1010 of FIG. 9A, and merges overlapped production paths. The production path extractor 2112 stores the extracted and merged production path into the production path information 2020 of FIG. 9B as the production path ID 1021, the production path 1022, the measurement start time 1023 and the measurement end time 1024.

In Step S2102, for each production path extracted and merged in Step S2101, the production path quality generator 2113 generates, a production path quality indicating the quality of a group of products produced through the production path. The production path quality generator 2113 stores the generated production path quality into the production path information 1020 of FIG. 9B as the production path quality 1025.

In Step S2103, the path pattern generator 2114 specifies "1" as the "number of indispensable devices" and generates a possible path pattern(s) based on the production path 1022 of the production path information 1020 of FIG. 9B. The path pattern generator 2114 stores the generated path pattern(s) into the path pattern information 1030 of FIG. 9C as the path pattern ID 1031, the path pattern 1032, the measurement start time 1033 and the measurement end time 1034. At this time, the path pattern quality 1035 is initialized by an expression enabling distinction from invalidity, for example "N/A".

In Step S2104, the association relationship generator 2115 extracts an association relationship between the production path 1022 and the path pattern 1032 based on the production path information 1020 of FIG. 9B and the path pattern information 1030 of FIG. 9C, and stores the extracted association relationship into the association relationship information 1040 of FIG. 9D.

In Step S2105, the path pattern quality estimator 2116 estimates the quality of each path pattern based on the association relationship information 1040 of FIG. 9D and the production path quality 1025 of the production path information 1020 of FIG. 9B. The path pattern quality estimator 2116 stores the estimated quality of each path pattern into the path pattern information 1030 of FIG. 9C as the path pattern quality 1035.

In Step S2106, the path pattern generator 2114 determines whether a predetermined exit condition is satisfied. Specifically, the path pattern generator 2114 extracts, from the path pattern information 1030 of FIG. 9C, all the path patterns for which the value of the path pattern quality is equal to or larger than a predetermined threshold value. If the number of extracted path patterns is equal to or larger than a predefined value, or the number of times of execution of Step S2105, i.e. the number of times of estimation of the path pattern quality is equal to or larger than a predetermined of number of times, the path pattern generator 2114 determines that the exit condition has been satisfied, and the process goes to Step S2108. Otherwise, the path pattern generator 2114 determines that the exit condition has not been satisfied, and the process goes to Step S2107.

In Step S2107, the path pattern generator 2114 increments the "number of indispensable devices" by one, and generates a possible path pattern(s). The path pattern generators 2114 stores the generated path pattern(s) into the path pattern information 1030 of FIG. 9C. At this time, the path pattern quality 1035 is initialized by an expression enabling distinction from invalidity, for example "N/A". After that, the process returns to Step S2104.

In Step S2108, the defective path pattern identifier 2117 identifies, based on the path pattern information 1030 of FIG. 9C, a path pattern(s) for which the value of the path pattern quality is equal to or larger than a predetermined threshold value, as a "defective path pattern(s)" suspected to produce a defective product.

In Step S2109, the defective path pattern identifier 2117 identifies a device(s) commonly included in the defective path pattern(s) identified in Step S2108. The defective path pattern identifier 2117 outputs the identified device(s) to the monitor (not shown) as a device(s) suspected to be defective such as failure or cyberattack from the outside.

Next, the process of the flow chart illustrated in FIG. 11 is described. As described above, the process of the flow chart of FIG. 10 is repeatedly called from Step S2201 of the flow chart of FIG. 11.

In Step S2201, the defective path pattern identifier 2117 specifies a plurality of time ranges, and calls the process of the flow chart of FIG. 10 in the plurality of number of times. In each call, the defective path pattern identifier 2117 obtains all the path patterns included in FIG. 9C when the exit condition of Step S2106 of FIG. 10 is satisfied.

For example, the following process is executed if first to third time ranges are specified, and the process of the flow chart of FIG. 10 is called in three times.

First, in the first time, the defective path pattern identifier 2117 specifies a measurement start time t0 and a measurement end time t1 as the first time range, and calls the process of FIG. 10. Then, the defective path pattern identifier 2117 obtains all the path patterns included in FIG. 9C when the exit condition of Step S2106 of FIG. 10 is satisfied.

Next, in the second time, the defective path pattern identifier 2117 specifies the measurement start time t1 and a measurement end time t2 as the second time range, and calls the process of FIG. 10. Then, the defective path pattern identifier 2117 obtains all the path patterns included in FIG. 9C when the exit condition of Step S2106 of FIG. 10 is satisfied.

Finally, in the third time, the defective path pattern identifier 2117 specifies the measurement start time t2 and a measurement end time t3 as the third time range, and calls the process of FIG. 10. Then, the defective path pattern identifier 2117 obtains all the path patterns included in FIG. 9C when the exit condition of Step S2106 of FIG. 10 is satisfied.

In Step S2202, the defective path pattern identifier 2117 goes to Step S2203 if there is a path pattern(s) for which the temporal transition of the path pattern quality for the past three times deviates from a predetermined range. Otherwise, the defective path pattern identifier 2117 finishes the process.

In Step S2203, the defective path pattern identifier 2117 identifies the path pattern(s) for which the temporal transition of the path pattern quality for the past three times deviates from the predetermined range as a "defective path pattern(s)".

In Step S2204, the defective path pattern identifier 2117 identifies a device(s) commonly included in the defective path pattern(s) identified in Step S2203. The defective path pattern identifier 2117 outputs the identified device(s) to the monitor (not shown) as a device(s) suspected to be defective such as failure or cyberattack from the outside.

Example 2

Figure 12:
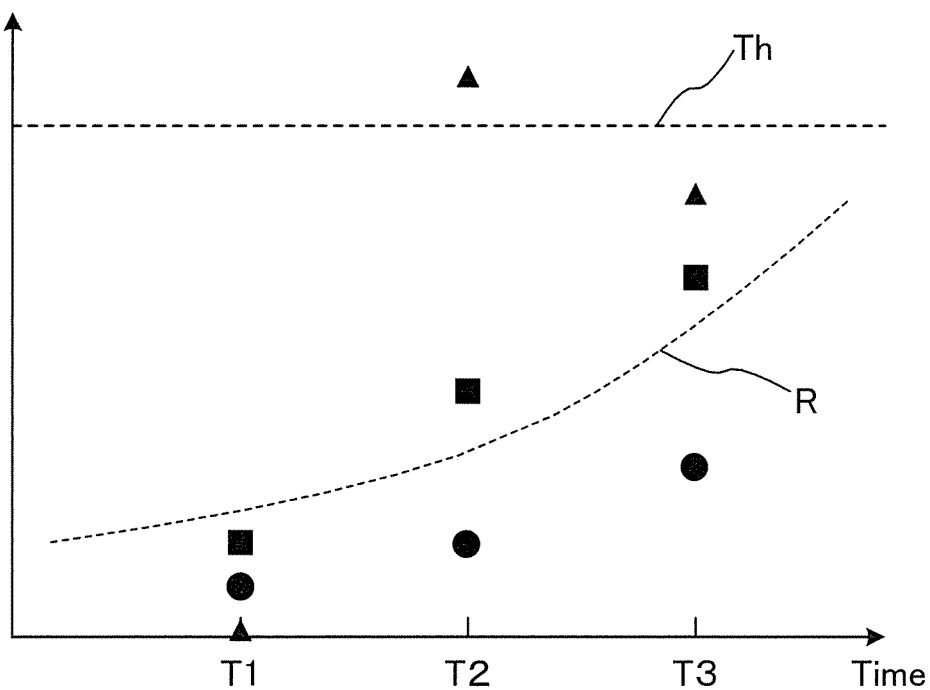
FIG. 12 shows temporal transition of a value of the path pattern quality in Example 2 of the second embodiment of the present invention.

FIG. 12 shows an example of the temporal transition of the path pattern quality obtained by the apparatus for identifying defective 2101 according to the second embodiment of the present invention.

The circles represent a case in which the value of the path pattern quality in each of time ranges T1 to T3 and the temporal transition of the value of the path pattern quality are both normal. The symbol "Th" of FIG. 12 represents a predetermined threshold value, which is used in Step S2106 of FIG. 10.

The triangles represent a case in which the value of the path pattern quality in the time range T2 is defective.

The squares represent a case in which the temporal transition of the value of the path pattern quality in each of the time ranges T1 to T3 is defective. A region below the line R of FIG. 12 is a predetermined range, which is used in Step S2202 of FIG. 11.

As described above, the apparatus for identifying defective 2101 according to the second embodiment of the present invention further identifies a path pattern(s) for which the temporal transition of the value of the path pattern quality deviates from a predetermined range as a defective path pattern(s). With this, in addition to the advantageous effects obtained in the first embodiment, it is possible to handle a defective situation in which the path pattern quality worsens over time.

REFERENCE SIGNS LIST

101, 2101 apparatus for identifying defective, 112, 2112 production path extractor, 113, 2113 production path quality generator, 114, 2114 path pattern generator, 115, 2115 association relationship generator, 116, 2116 path pattern quality estimator, 117, 2117 defective path pattern identifier

The invention claimed is:

1. An apparatus for identifying a path pattern of a plurality of devices that cause to produce a defective product in a production line where the product is produced via the devices, the apparatus comprising:
- a production path extractor configured to extract from a received product information, a production path indicating the devices through which the product passes when it is produced and an order in which the product passes through the devices;
- a production path quality generator configured to generate a production path quality value indicating a quality of a group of products produced through the production path;
- a path pattern generator configured to generate a possible path pattern indicating the devices through which the product passes when it is produced and the order in which the product passes through the devices, in accordance with a number of indispensable devices indicating a number of devices that must be included in the path pattern;
- an association relationship generator configured to generate an association relationship between the production path and the path pattern;
- a path pattern quality estimator configured to estimate a path pattern quality value indicating a quality of the group of products produced through the production path included in the path pattern, based on the association relationship and the production path quality value; and
- a defective path pattern identifier configured to identify, the path pattern for which the value of the path pattern quality is equal to or larger than a predetermined threshold value as a defective path pattern.

2. The apparatus according to claim 1, wherein the path pattern generator is configured to:
- set an initial value of the number of indispensable devices to 1 to generate the path pattern; and
- repeatedly generate the path pattern by incrementing the number of indispensable devices by one until a number of defective path patterns is equal to or larger than a predetermined value.

3. The apparatus according to claim 1, wherein the path pattern generator is configured to:
- set an initial value of the number of indispensable devices to 1 to generate the path pattern; and
- repeatedly generate the path pattern by incrementing the number of indispensable devices by one until a comparison result between a tendency of a first path pattern quality value estimated at a previous iteration and a tendency of a second path pattern quality value estimated at a current iteration converges to a predetermined range.

4. The apparatus according to claim 1, wherein the path pattern generator is configured to:
- set an initial value of the number of indispensable devices to 1 to generate the path pattern; and
- repeatedly generate the path pattern by incrementing the number of indispensable devices by one until the number of indispensable devices with a least number of defective path patterns is identified.

5. The apparatus according to claim 1, wherein the defective path pattern identifier is further configured to identify the path pattern for which temporal transition of the value of the path pattern quality deviates from a predetermined range as the defective path pattern.

6. The apparatus according to claim 1, wherein the defective path pattern identifier is further configured to identify a device from the devices that is commonly included in the defective path pattern as the device suspected to be defective and to output the identified device in an order of degree of defectiveness.

7. A method of identifying a path pattern of a plurality of devices that cause to produce a defective product in a production line where the product is produced via the devices, the method comprising the steps of:
- Extracting, from a received product information, a production path indicating the devices through which the product passes when it is produced and an order in which the product passes through the devices;
- generating a production path quality value indicating a quality of a group of products produced through the production path;
- generating a possible path pattern indicating the devices through which the product passes when it is produced and the order in which the product passes through the devices, in accordance with a number of indispensable devices indicating a number of devices that must be included in the path pattern;
- generating an association relationship between the production path and the path pattern;
- estimating a path pattern quality value indicating a quality of the group of products produced through the production path included in the path pattern, based on the association relationship and the production path quality value; and
- identifying the path pattern for which the value of the path pattern quality is equal to or larger than a predetermined threshold value as a defective path pattern.

8. The method according to claim 7, wherein the step of generating the path pattern includes:
- setting an initial value of the number of indispensable devices to 1 to generate the path pattern; and
- repeatedly generating the path pattern by incrementing the number of indispensable devices by one until a number of defective path patterns is equal to or larger than a predetermined value.

9. The method according to claim 7, wherein the step of generating the path pattern includes:
- setting an initial value of the number of indispensable devices to 1 to generate the path pattern; and
- repeatedly generating the path pattern by incrementing the number of indispensable devices by one until a comparison result between a tendency of a first path pattern quality value estimated at a previous iteration and a tendency of a second path pattern quality value estimated at a current iteration converges to a predetermined range.

10. The method according to claim 7, wherein the step of generating the path pattern includes:
- setting an initial value of the number of indispensable devices to 1 to generate the path pattern; and
- repeatedly generating the path pattern by incrementing the number of indispensable devices by one until the number of indispensable devices with a least number of defective path patterns is identified.

11. The method according to claim 7, wherein the step of identifying the defective path pattern further includes identifying the path pattern for which temporal transition of the value of the path pattern quality deviates from a predetermined range as the defective path pattern.

12. The method according to claim 7, wherein the step of identifying the defective path pattern further includes identifying a device from the devices that is commonly included in the defective path pattern and outputting the identified device in an order of degree of defectiveness.

13. The method of claim 7, wherein the method is performed by executing a computer program.

* * * * *